United States Patent [19]

Nakazawa

[11] Patent Number: 4,983,992

[45] Date of Patent: Jan. 8, 1991

[54] PRINTING HEAD FOR RESISTIVE RIBBON TYPE PRINTING APPARATUS

[75] Inventor: Ribun Nakazawa, Tokyo, Japan

[73] Assignee: Teikoku Piston Ring Co., Ltd., Tokyo, Japan

[21] Appl. No.: 369,081

[22] Filed: Jun. 20, 1989

[51] Int. Cl.[5] ........................ G01D 15/10; H05B 3/00

[52] U.S. Cl. ................................ 346/76 PH; 219/216; 346/155

[58] Field of Search ........................ 346/76 PH, 155; 219/216

[56] References Cited

U.S. PATENT DOCUMENTS

| | | | |
|---|---|---|---|
| 3,744,611 | 7/1973 | Montanari et al. . | |
| 4,350,449 | 9/1982 | Countryman et al. | 400/120 |
| 4,456,915 | 6/1984 | Crooks et al. | 346/76 PH |

FOREIGN PATENT DOCUMENTS

| | | |
|---|---|---|
| 59-55734 | 10/1985 | Japan . |
| 59-55735 | 10/1985 | Japan . |
| 60-214971 | 10/1985 | Japan . |
| 60-214972 | 10/1985 | Japan . |
| 60-138352 | 12/1986 | Japan . |
| 60-138353 | 12/1986 | Japan . |
| 61-295050 | 12/1986 | Japan . |
| 61-295051 | 12/1986 | Japan . |

*Primary Examiner*—Bruce A. Reynolds
*Assistant Examiner*—Gerald F. Preston
*Attorney, Agent, or Firm*—Paul & Paul

[57] ABSTRACT

A printing head which comprises an insulating substrate and a plurality of printing electrodes for a resistive ribbon type printing apparatus, in which a ribbon composed of a layer of thermal transferable ink and an electrical resistive layer is supplied with an electric current through selected printing electrodes so that the current passes through a portion of the resistive layer to generate Jule heat and melt a portion of the ink layer, and the molten ink is transferred to a paper. The printing electrodes are made of a plating material and the substrate is made of a machinable ceramic having a hardness equal to or lower than the hardness of the printing electrodes.

7 Claims, 1 Drawing Sheet

PRINTING HEAD FOR RESISTIVE RIBBON TYPE PRINTING APPARATUS

BACKGROUND OF THE INVENTION

1. Field of the Invention

The present invention relates to an electro-thermal printing apparatus, and more particularly, to a printing head for a resistive ribbon type printing apparatus. The ribbon used in such a printing apparatus comprises a flexible base insulating (or conductive) film, a layer of thermal transferable ink facing a paper, and an electrically resistive layer facing the printing head. When an electric current is made to flow through a portion of the resistive layer from the printing electrodes coming into contact with the resistive layer, Joule heat is generated at the portion at which the current is flowing, to melt a portion of the ink layer, and the molten ink is transferred onto a paper to form a printed image.

2. Description of the Related Art

Such a resistive ribbon type printing apparatus and the printing head thereof have been proposed in, e.g., U.S. Pat. Nos. 3744611, 4350449, and 4456915. Also such printing heads are disclosed in, e.g., Japanese Unexamined Patent Publication (JUPP) Nos. 60-214972, 60-214971, 61-295050, and 61-295051.

According to JUPP No. 60-214972, a printing head is produced by printing a conductive paste including a hard metal such as W, Mo and Mn over the entire surface of a ceramic green sheet, sintering the printed green sheet, and selectively etching the sintered metal layer (metallized layer) to form a plurality of electrodes, by a photolithography process. In this case, for example, the printing head comprises a ceramic substrate made of magnesia and silicon dioxide and having a hardness of from to 500 to 600 Hv, and tungsten electrodes having a hardness of about 700 Hv and a density of 3 electrodes per mm. When the printing head is operated, the substrate and electrodes come into contact with the ribbon simultaneously. Nevertheless, a conventional ceramic substrate has a relatively high hardness, and therefore, the electrodes should have a higher hardness, which leads to the problem of an insufficient formation of fine pattern electrodes, as it is difficult to selectively etch the hard metal (W) layer to form fine electrodes.

According to JUPP No. 60-214971, a printing head is produced by depositing a conductive layer over the entire surface of a ceramic substrate by a vacuum evaporation or sputtering process, forming a plating layer on the conductive layer by an electroless plating process, and selectively etching the layers to form a plurality of electrodes by a photolithography process. In this case, for example, the ceramic substrate is made of magnesia and silicon dioxide and has a hardness of from 500 to 600 Hv, and the electrodes are made of Ni-W plating layer having a thickness of 10 μm and a hardness of about 800 Hv. Since it is difficult to selectively etch such a hard alloy plating layer to form fine pattern electrodes, the obtained electrodes have an electrode density of 3 lines/mm. Furthermore, an adhesion strength of the electrodes (i.e., the conductive layer of Ni-W) to the substrate is low, since the vacuum evaporation (or sputtering) process is adopted.

According to JUPP No. 61-295050, a narrow stripe insulating projection is formed on a ceramic substrate, and a plating layer is formed on the projection and the substrate and selectively etched to form electrodes. In operation, only the plating layer portions covering the projection come into contact with the ribbon, i.e., the substrate does not come into contact with the ribbon.

According to JUPP No. 61-295051, a plating layer is formed on a ceramic substrate and is selectively etched to form electrode lines, electrode contacts are formed by build-up plating on predetermined portions of the electrode lines, and only the electrode contacts come into contact with the ribbon.

In both JUPP No. 61-295050 and JUPP No. 61-295051, the service life of the printing heads is limited by the wear of the contact portions of the electrodes, and since the thickness of the plating layer at these contact portions is relatively thin (for example, 10 to 40 μm), the printing heads have a relatively short service life.

SUMMARY OF THE INVENTION

An object of the present invention is to provide a printing head having fine pattern electrodes by which the printed image quality is improved.

Another object of the present invention is to provide an improved printing head in which a substrate and electrodes formed thereon simultaneously come into contact with a conductive layer of a ribbon.

These and other objects of the present invention are realized by providing a printing head for a resistive ribbon type printing apparatus, which printing head comprises an insulating substrate and a plurality of printing electrodes formed on the substrate, characterized in that the printing electrodes are made of a plating material and the substrate is made of a machinable ceramic having a hardness not higher than the hardness of the printing electrodes.

Preferably, the plating material for the electrodes is an alloy plating of an iron family element such as Fe, Co and Ni, and a refractory metal such as W, Mo and Re; for example, the alloy plating is composed of Ni-W, Co-W, Ni-Mo, Co-Mo or the like.

Also preferably, the machinable ceramic has a hardness of from 200 to 400 Hv and is a nonporous mica ceramic in which mica is uniformly crystallized in a glass matrix. If the hardness of the machinable ceramic substrate is lower than 200 Hv, the substrate hardness becomes far lower than the hardness of the electrodes, and thus the substrate wears at a much faster rate than the electrodes, which lowers the durability of the printing head even though the electrodes still function as required. When the hardness of the substrate is equal to that of the electrodes, the substrate and electrodes wear at the same rate, but if the substrate hardness is higher than the electrode hardness, the electrodes wear faster than the substrate, and as a result, the worn electrodes do not come into proper contact with the ribbon, and thus the quality of the printed image is remarkably lowered. The hardness of the printing head is lower than conventional printing heads, so that the head does not damage a ribbon (a resistive layer) so much as the conventional head.

BRIEF DESCRIPTION OF THE DRAWINGS

The present invention will be more apparent from the description of the preferred embodiment set forth below, with reference to the accompanying drawings, in which.

DESCRIPTION OF THE PREFERRED EMBODIMENT

Figure 1:
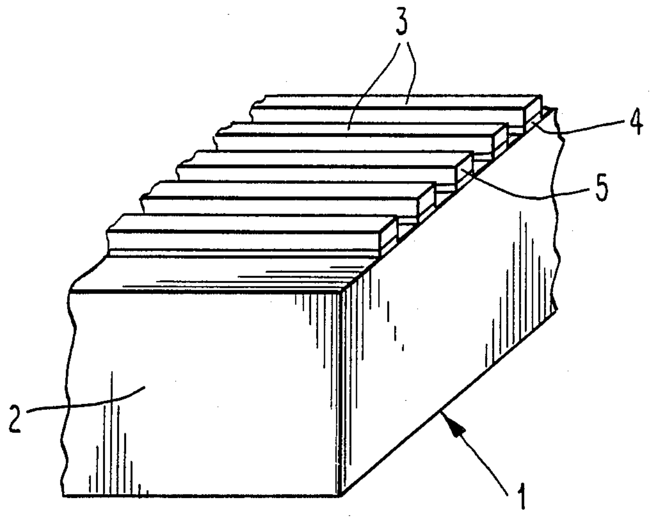
FIG. 1 is a partial perspective view of a printing head for a resistive ribbon type printing apparatus, according to the present invention.

Referring to FIG. 1, a printing head 1 according to the present invention comprises a machinable ceramic substrate 2, fine pattern electrodes 3, and an underlying plating layer 4.

The printing head 1 for a resistive ribbon type printing apparatus is produced in the following manner.

First, the head substrate 2 is made of a nonporous mica ceramic containing mica uniformly crystallized in a glass matrix. Such a mica (machinable) ceramic is commercially available as Photveel (trade name of Photon Ceramics Kabushiki Kaisha) or Macor (trade name of Corning Glass Works Co.,). The substrate 2 has a hardness of 380 Hv. A Cu electroless plating layer is deposited to a thickness of 2 μm over the entire surface of the substrate 2, and a photoresist layer is coated over the Cu plating layer to a thickness of 2 μm, and is exposed and developed to form a resist pattern forming a fine electrode pattern. The Cu electroless plating layer is selectively etched, using the resist pattern as a mask, to form the patterned underlying plating layer 4.

Next, by using the Cu patterned layer 4 as an negative electrode in an electroplating process, Co-W alloy plating electrodes 3 (having a thickness of 20 μm and a hardness of 630 Hv) are deposited on the layer 4 only, and accordingly, the desired printing head is obtained.

As the underlying plating layer 4, an electroless alloy plating layer composed of, e.g., Ni-P, Ni-B, Ni-W-P, Co-P, Co-B and Co-W-P, may be used instead of the Cu plating layer.

The produced printing head has fine pattern electrodes 3 at an electrode density of 16 lines/mm, which is greater than that (3 lines/mm) of a conventional printing head of the above-cited JUPP Nos. 60-214972 and 60-214971. Therefore, the produced printing head can print images in a finer mode, compared with the conventional printed image of JUPP Nos. 60-214972 and 60-214971.

Figure 2:
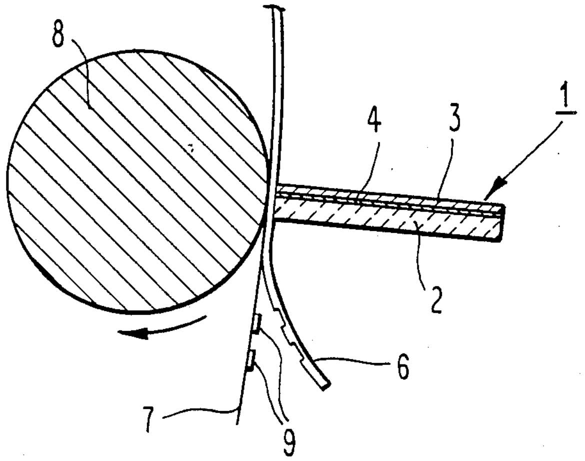
FIG. 2 is a schematic sectional view of the printing head, a ribbon, a paper, and a roller, during a printing operation.

When the obtained printing head is operated, as shown in FIG. 2, the end side surfaces 5 (FIG. 1) of the electrodes 4 are brought into contact with a resistive layer of a ribbon 6, to cause a thermal transferable ink layer thereof to come into contact with a paper 7. A roller 8 of, e.g., rubber, is arranged in such a manner that the ribbon 6 and the paper 7 are sandwiched between the roller 8 and the head 1. The roller 8 pushes the ribbon 6 and paper 7 against the electrode 4 and the substrate 2, and further, conveys the paper 7. Some of the electrodes 4 are selectively supplied with an electric current, in accordance with an image to be printed, and this current is passed to a portion of the resistive layer through the elected electrodes to generate joule heat at the portion through which the current flows. The generated joule heat melts a corresponding portion of the ink layer, and the molten ink is transferred onto the paper 7 to form the printed image 9.

According to the present invention, a plurality of electrodes formed on the machinable ceramic substrate are shaped into a finer pattern, i.e., the electrode density (lines per mm) is increased, whereby a high quality printed image is obtained. The printing head (i.e., the electrodes and substrate) is continuously worn away over a long term operation, but the side surfaces of the head are correspondingly constantly renewed, and thus the service life of the printing head is prolonged.

It will be obvious that the present invention is not restricted to the above-mentioned embodiment and that many variations are possible for persons skilled in the art without departing from the scope of the invention. For example, the alloy plating for the electrodes can be subjected to a suitable heat-treatment to adjust the hardness thereof.

What is claimed:

1. A printing head for a resistive ribbon type printing apparatus, which printing head comprises an insulating substrate and a plurality of printing electrodes formed on the substrate, characterized in that each of said printing electrodes is made of a patterned electroless-plating thin layer and an electroplating material formed on the electroless-plating thin layer and said substrate is made of a nonporous machinable ceramic having a hardness not higher than a hardness of said electroplating material.

2. A printing head according to claim 1, wherein said plating material is an alloy plating composed of an iron family element and a refractory metal.

3. A printing head according to claim 2, wherein said iron family element is Fe, Co or Ni.

4. A printing head according to claim 1, wherein said refractory metal is W, Mo or Re.

5. A printing head according to claim 1, wherein said nonporous machinable ceramic has a hardness of from 200 to 400 Hv.

6. A printing head according to claim 1, wherein said machinable ceramic is a nonporous mica ceramic.

7. A printing head according to claim 1, wherein said patterned electroless-plating layer is copper and is formed by a photolithography process.

* * * * *